Sept. 6, 1938.                H. H. HARMON                2,129,210
                             SHUTTER ACTUATOR
                            Filed July 16, 1937
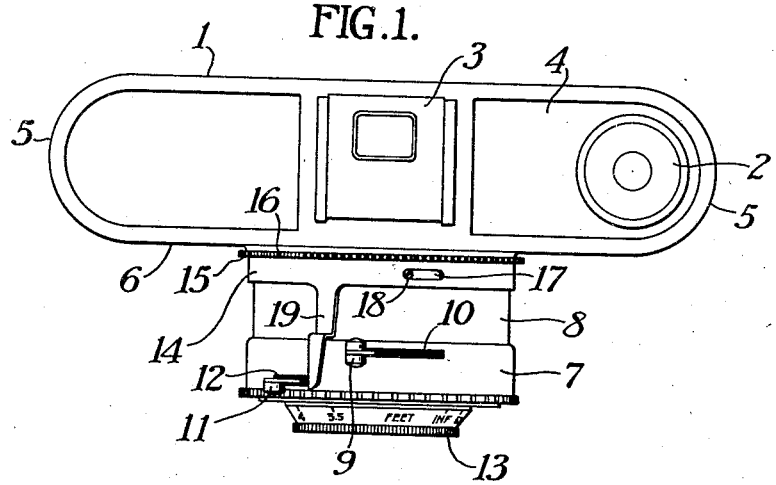
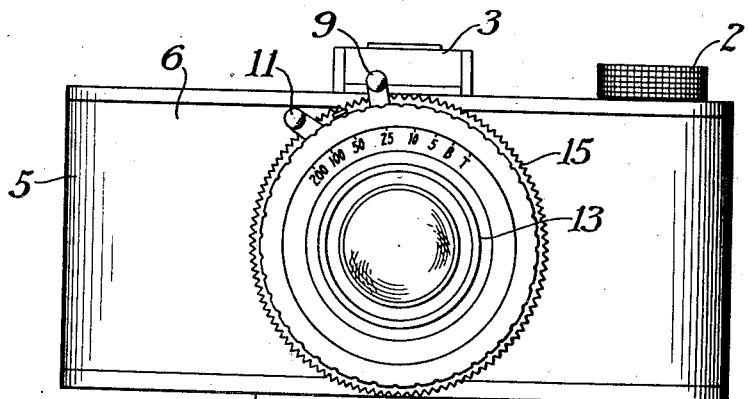
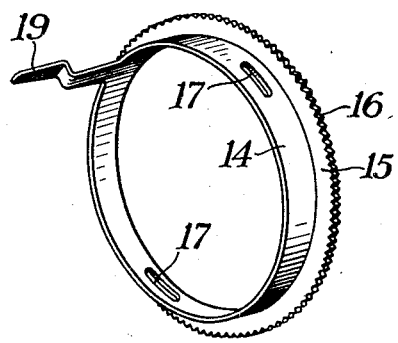
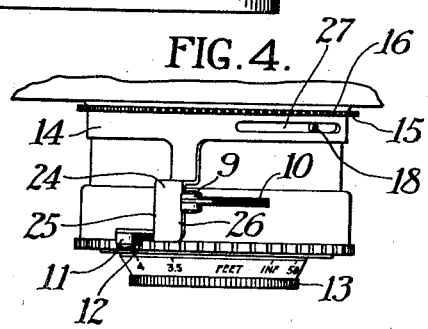
Herbert H. Harmon
INVENTOR.
BY  Newton M. Perines
    Donald H. Stewart
              ATTORNEYS Patented Sept. 6, 1938

2,129,210

UNITED STATES PATENT OFFICE 2,129,210

SHUTTER ACTUATOR

Herbert H. Harmon, Rochester, N. Y., assignor to Eastman Kodak Company, Rochester, N. Y., a corporation of New Jersey Application July 16, 1937, Serial No. 153,997

4 Claims. (Cl. 95—53)

This invention relates to photography and more particularly to photographic camera shutter actuators.

One object of my invention is to provide a shutter with an actuator which may be manually operated from any point around the entire periphery of the shutter. Another object of my invention is to provide a camera which includes a shutter actuator which can be readily operated by a finger of a hand holding the camera. Another object of my invention is to provide a camera which can be readily grasped by both hands and to include a shutter actuator which can be readily operated by a finger of either hand holding the camera. Still another object of my invention is to equip a shutter of the setting type with an oscillatable member having a finger grip extending at least partially around the shutter which can be oscillated to both set and release the camera shutter, and other objects will appear from the following specification, the novel features being particularly pointed out in the claims at the end thereof.

Coming now to the drawing wherein like reference characters denote like parts throughout:

Fig. 1 is a top plan view of a camera constructed in accordance with and embodying a preferred form of my invention.

Fig. 2 is a front elevation of the camera shown in Fig. 1.

Fig. 3 is a detail perspective view of a preferred form of shutter actuator removed from the shutter.

Fig. 4 is a modified form of the invention shown in the preceding figures.

In the so-called miniature cameras which are held at eye level for making exposures, it is frequently difficult to reach the trigger on the shutter by which an exposure is made, particularly as the camera may be held in a variety of different positions. My present invention is particularly designed to overcome the usual difficulties by providing an oscillatable finger grip which extends around a large part—preferably the entire periphery—of the shutter, so that at least a portion of the finger grip is readily accessible regardless of the position in which the camera is held while an exposure is being made.

In Figs. 1 and 2, I have illustrated a preferred form of my invention, in which a camera body 1 may be equipped with the usual type of film winding key 2. On top of the camera body there is preferably mounted a folding finder of the direct view type, designated broadly as 3. The camera includes a top wall 4, rounded end walls 5 and a front wall 6, on which the camera shutter 7 is mounted by means of a somewhat elongated tubular extension 8.

The shutter 7 may be of any well known type and is here shown as being a shutter of the setting type including a shutter setting lever 9 having a path of movement through the slot 10 and a shutter trigger 11 having a path of movement through the slot 12.

If desired, the shutter may be equipped with a focusing objective of a known type and this objective may include a knurled ring 13 which may be turned to focus an image on the focal plane of the shutter.

In accordance with my invention, I mount a shutter actuating member on the shutter, preferably adjacent to the camera, in such a manner that regardless of the position in which the camera may be held, a portion of the release may be readily grasped and oscillated to operate the shutter.

In a preferred embodiment of my invention, I provide an annular member 14 of a size to rotate upon the tubular member 8, the annular member 14 being preferably provided with an outstanding flange 15 which is preferably knurled or otherwise roughened at 16 to form a convenient grip. The annular member 14 may carry one or more slots 17 to engage one or more pins 18 on the tubular member 8, so that the annular member or ring may oscillate when turned by the knurled flange 16. The annular member also carries an arm 19 which crosses the path of the trigger 11 and which is adapted to engage and move the trigger when the ring is manually operated. Thus, when it is desired to make an exposure, the lever 9 is moved through its path of movement in the slot 10 to tension the shutter spring, after which an operator may readily move the trigger 11 to trip the shutter by merely moving the ring 14 through any portion of the knurling 16 which is most convenient. Thus, it is immaterial how the camera is held because there is always a portion of the knurling 16 which is convenient for the operator to move. The knurling preferably extends entirely around the shutter, although a quite satisfactory shutter tripping member may be made by providing a knurling which does not extend completely around the shutter.

However, as indicated in Figs. 1 and 2, it is preferable to have the knurling extend adjacent to the top wall 4 and to the bottom wall 20 of the camera, and it is likewise preferable to have the knurling lie adjacent to the front wall 6, spaced a slight distance therefrom. The reason for this is that it is not desirable to have this ring project into a position in which it may be accidentally operated by laying the camera down or by having the ring come in contact with the clothes of a camera user.

If desired, the oscillatable ring 14 may be provided with portions which not only engage the shutter trigger, but also engage the shutter setting member so that movement of the ring in one direction will set the shutter and movement of the ring in an opposite direction will trip the shutter. Accordingly, I have shown such a form of the invention in Fig. 4. In this figure, the ring 14 is exactly like the ring shown in the preceding figures having an outstanding flange 15 which is roughened at 16 to form an operating grip. The ring differs from the ring previously described in that there is an outstanding arm 24 which has portions 25 and 26 adapted to engage the shutter trigger 11 and the shutter setting member 9. Thus, when the knurling 16 is moved in a clockwise direction facing the front wall 6 of the camera body, the setting lever 9 is moved through its path of movement through the slot 10 to tension the shutter spring. By moving the knurled ring 16 in an opposite direction, portion 25 engages the shutter trigger 11 and trips the shutter.

To accommodate this somewhat greater movement than has been found necessary for the first-described embodiment of my invention, the ring 14 is provided with a slot 27 which is longer than the slot 17 so that the pin 18 will permit the ring to move a sufficient distance for both setting and tripping the shutter.

As indicated in Fig. 3, I prefer to provide two slots 17 in the ring 14, although obviously the number of these slots can be varied at will.

With the first-described embodiment of my invention, the ring 14 moves very readily upon the tubular member 8 and consequently the spring of the camera shutter trigger 11 normally holds the knurled ring in the position shown in Fig. 1, in which it is in contact with an edge of the shutter trigger 11. However, if desired, the extent of movement of the ring 14 may be varied to suit the particular type of shutter and trigger construction which may be employed with it, and where a shutter of a setting type is employed, the ring may be shaped so that portions will engage both the trigger and the setting member. It is obvious that my invention is useful on any of the standard types of shutters which may be used on photographic cameras and that the particular shape and design of the ring is not material. Shutters of the setting and non-setting type may, of course, be employed.

The operation of my invention is extremely simple. With the shutter actuator built as described above, the operator may readily make exposures with the camera held in any position, and this actuator is particularly adapted for use on cameras held at eye level. If the shutter is of the setting variety and the ring is of the construction shown in Fig. 4, the operator may hold the camera by its curved ends and place one or more fingers on the knurled portion of the ring adjacent the front wall 6 of the camera. By turning the ring in a clockwise direction with respect to the front of the camera, the setting lever 9 may be moved through its path of movement through the slot 10 to place the shutter spring under tension and prepare the shutter mechanism for an exposure. By then moving this ring in a reverse direction the trigger 11 may be slowly moved through its path of movement through the slot 12 to make an exposure. This operation can be readily accomplished without removing either hand from the camera body, and it greatly assists in keeping the camera perfectly steady during the exposure. Moreover, the ring can be operated in a great many different ways, because it entirely encircles the annular member 8 and because it can be moved from any point radially of the shutter.

I am aware that George H. Ohlau, in U. S. Patent 1,698,063, granted January 8, 1929, for "Aviation camera shutter operating mechanism" shows a ring mounted to oscillate on a shutter for setting and tripping the shutter. However, this ring can only be actuated from the outside of the camera through its connections with a movable handle mounted on the outside of the camera body. My claims do not cover such a ring broadly, but only in connection with a shutter and camera in which it also carries a shutter release which may be operated from various points around the shutter.

Having thus described my invention, what I claim as new and desire to be secured by Letters Patent of the United States is:

1. A shutter for photographic cameras comprising an annular shutter casing, a trigger projecting therefrom, a trigger actuating member comprising a plate curved to fit the curvature of the annular shutter casing and slidably mounted thereon, means carried by the trigger actuating member and casing for limiting movement of the former on the latter, a curved flange carried by the curved plate concentric with the shutter casing, means carried by the curved plate extending therefrom to engage the shutter trigger for actuating the same, a curved roughened area on the curved flange concentric with the shutter casing and extending at least partially around the shutter whereby various parts of said roughened surface may be used as a manual shutter release.

2. In a photographic camera, the combination with a camera body, of an objective carried directly by the camera casing, a ring mounted concentrically of the objective to turn relatively thereto, an annular flange carried by the ring, a roughened and continuous finger grip carried by the edge of the annular flange, an arm projecting from the ring and movable through a path, a shutter carrying an objective, a trigger for the shutter extending across the path of movement of the arm and adapted to be moved thereby, a setting lever having a path of movement extending across the path of movement of said arm and adapted to be moved thereby, said ring, when turned by a portion of the roughened and continuous finger grip extending along the edge of the annular flange, being adapted to set and release said shutter.

3. In a photographic camera, the combination with a camera body including edge walls, a shutter carried thereby, an annular member connecting the shutter and camera, a ring mounted to turn on the annular member, a knurled flange carried by said ring adjacent the camera body and having the knurling thereof extending concentrically of the shutter and at least around a substantial portion of the ring, said knurling lying adjacent the edge walls of the camera irrespective of the position of the ring, a shutter trigger extending from and movably mounted on the shutter, and means carried by the ring for engaging the trigger, whereby an operator may move the trigger by turning the ring through any convenient portion of the knurled flange lying adjacent the camera edge walls.

4. In a photographic camera, the combination with a camera body including front and edge walls, a shutter carried thereby, an annular member connecting the shutter and camera, a ring mounted to turn on the annular member, a knurled flange carried by the ring adjacent the camera body and having the knurling thereof extending concentrically of the shutter and at least around substantial portions of the ring, said knurling also lying adjacent the front and edge walls of the camera, lying parallel to the front wall, a shutter trigger extending from and movably mounted in the shutter and means carried by the ring for engaging the shutter trigger, whereby an operator may move the trigger by turning the ring through its knurling by means of fingers of his hands also holding portion of the camera.

HERBERT H. HARMON.